US012642283B2

(12) United States Patent
Kristensen et al.

(10) Patent No.: US 12,642,283 B2
(45) Date of Patent: Jun. 2, 2026

(54) ICE CREAM FREEZER

(71) Applicant: Tetra Laval Holdings & Finance S.A., Pully (CH)

(72) Inventors: Kurt Kristensen, Tranbjerg (DK); Erik Jimmy Wolf Petersen, Vejle (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 148 days.

(21) Appl. No.: 18/258,369

(22) PCT Filed: Nov. 24, 2021

(86) PCT No.: PCT/EP2021/082807
§ 371 (c)(1),
(2) Date: Jun. 20, 2023

(87) PCT Pub. No.: WO2022/144131
PCT Pub. Date: Jul. 7, 2022

(65) Prior Publication Data
US 2024/0032563 A1      Feb. 1, 2024

(30) Foreign Application Priority Data

Dec. 30, 2020    (EP) .................................... 20217934

(51) Int. Cl.
*A23G 9/22* (2006.01)
*A23G 9/16* (2006.01)
*A23G 9/28* (2006.01)
(52) U.S. Cl.
CPC ............. *A23G 9/224* (2013.01); *A23G 9/166* (2013.01); *A23G 9/281* (2013.01)

(58) Field of Classification Search
CPC ........ A23G 9/222; A23G 9/224; A23G 9/166; A23G 9/18; A23G 9/283; A23G 9/281; A23G 9/28; A23G 9/288
See application file for complete search history.

(56) References Cited

U.S. PATENT DOCUMENTS 2,281,944 A      5/1942 Miller et al.
4,129,389 A     12/1978 Wakeman et al.
(Continued)

FOREIGN PATENT DOCUMENTS

CN      103506047 A     1/2014
CN      207385268 U     5/2018
(Continued)

OTHER PUBLICATIONS

International Search Report mailed Mar. 3, 2022, for priority International Application No. PCT/EP2021/082807.

*Primary Examiner* — Miguel A Diaz
(74) *Attorney, Agent, or Firm* — Renner, Otto, Boisselle & Sklar, LLP

(57) ABSTRACT

An ice cream freezer comprising an elongated housing having a jacket and an interior space in which a dasher with a rotatable hollow cylinder body is arranged, the cylinder body comprising a scraper blade arranged along the periphery of the cylinder body, an inlet located before the scraper blade for allowing ice cream mixture to enter an inside of the cylinder body, and an outlet located after the scraper blade for allowing ice cream mixture to leave the inside of the cylinder body, wherein the inlet comprises a lead surface that has a lead angle of at least 3° for pushing the ice cream mixture in the axial direction of the cylinder body.

15 Claims, 5 Drawing Sheets

(56)     References Cited

U.S. PATENT DOCUMENTS

Figures 1, 2, 3, 4:
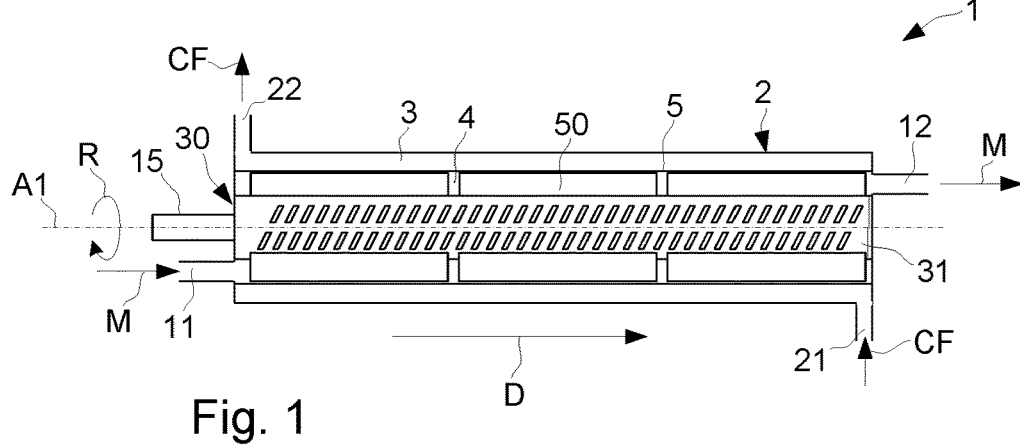

| | | | |
|---|---|---|---|
| 4,162,127 A | 7/1979 | Wakeman et al. | |
| 12,225,915 B2 * | 2/2025 | Wagner ............... | B01F 27/1161 |
| 2015/0335041 A1 * | 11/2015 | Baungaard ............... | A23G 9/04 |
| | | | 62/135 |

FOREIGN PATENT DOCUMENTS

| | | | |
|---|---|---|---|
| CN | 112106881 | A | 12/2020 |
| EP | 1178734 | B1 | 2/2007 |
| WO | 2000070963 | A1 | 11/2000 |
| WO | 2007042028 | A1 | 4/2007 |
| WO | 2020236173 | A1 | 11/2020 |

* cited by examiner

800

ICE CREAM FREEZER

TECHNICAL FIELD

The invention relates to an ice cream freezer that has an elongated housing in which a dasher is arranged. The dasher has a hollow cylinder body for agitating and mixing ice cream mixture. A scraper blade is arranged along the periphery of the cylinder body, an inlet for the ice cream mixture is located before the scraper blade and an outlet for the ice cream mixture is located after the scraper blade, for allowing ice cream mixture to enter respectively leave the inside of the cylinder body. The invention is also related to a system and a method for producing ice cream by using this type of ice cream freezer.

BACKGROUND

Today a number of food handling apparatuses are used in the food processing industry to produce ice cream products, which include dairy based ice cream products as well as water-based frozen snack such as ice pops. Frozen custard, frozen yogurt, sorbet, gelato and frozen dairy dessert are some product names that are used to distinguish different varieties and styles of ice cream products.

During large scale production of an ice cream product, an ice cream mixture that shall be processed into the ice cream product is prepared. The mixture is often pumped through a continuous freezer which has two major functions. The first function is to whip a controlled amount of air into the mixture and the second function is to freeze a significant part of the water in the mixture into a large number of small ice crystals.

The continuous freezer typically has the form of a jacketed, cylinder-shaped housing in which knives, a dasher and sometimes also a beater are arranged to rotate. During production, the ice cream mixture is metered into the housing, for example by using a gear pump. At the same time, a constant airflow is fed into the housing and whipped into the mixture by the rotating dasher that is located within the jacketed housing. The dasher then effectively works as both an agitator and mixer for the ice cream mixture. A refrigerant passing through the jacket surrounding the housing freezes the ice cream mixture that is feed into the freezer, such that ice crystals are formed in the ice cream mixture. The ice cream mixture is thereafter used to form ice cream products.

The knives, also referred to as scraper blades, are arranged on the rotating dasher so that frozen mixture on the inside housing wall is continuously scraped off by the knifes. The dasher keeps the product agitated inside the dasher. A controlled amount of air is, either separately or along with the ice cream mixture, fed into the freezer. The rotation of the dasher ensures that the air is evenly mixed into the mixture, thereby forming a homogeneous ice cream mixture. If a beater is used for the freezer, the beater causes the mixture to be subjected to a whipping action that intensifies the mixing of the air into the ice cream mixture.

The mixing of air into the ice cream mixture increases its volume. 0.8 to 1 liter of air is commonly introduced for each liter of ice cream mixture. The temperature of the mixture when leaving the freezer is often from −8° C. to −3° C. depending on the type of ice cream product, where 30% to 55% of the water in the mixture may be frozen into ice crystals depending on the composition of the mixture.

To convey the ice cream mixture through the freezer a pump is often used to drive the ice cream mixture forward from the continues freezer, for example to an ingredient feeder, an ice cream forming apparatus or to a filling machine. Depending on the configuration, a pump may alternatively or additionally be arranged upstream the freezer for feeding the mixture into the freezer. As the temperature of the mixture gradually decreases when it passes through the freezer, its viscosity increases and more energy is required to convey the mixture through the freezer.

Examples of freezers for ice cream are found in patent documents EP1178734B1 and U.S. Pat. No. 4,162,127A.

Even though continuous ice cream freezers successfully freeze ice cream mixtures, there I still a limitation in respect of how low the temperature may be for the mixture passing through the freezer. In particular for low fat ice cream products such as sorbet and water ice the viscosity increases fast when lowering the temperature. The high viscosity of such products makes it challenging to provide sufficient pumping through the freezer, to ensure that sufficient discharge pressure to the discharge pump is provided. From another perspective, even though ice cream mixtures having a lower water content does not experience the same, rapid increase of viscosity, a relatively large amount of energy is still needed to convey the mixture through the freezer.

SUMMARY

It is an object of the invention to at least partly overcome one or more limitations of the prior art. In particular, it is an object to provide an ice cream freezer through which an ice cream mixture is more easily fed, for example to save energy and/or to ensure that there is a sufficient discharge out from the freezer.

In a first aspect of the invention, this is achieved by an ice cream freezer that comprises an elongated housing having a jacket and an interior space, and a dasher comprising a hollow cylinder body arranged in the interior space for rotating in a rotational direction about a central axis of the cylinder body to agitate and mix ice cream mixture that is fed through the interior space. The cylinder body comprises a scraper blade arranged along the periphery of the cylinder body, an inlet that is, as seen in the rotational direction, located before the scraper blade for allowing ice cream mixture to enter an inside of the cylinder body, and an outlet that is, as seen in the rotational direction, located after the scraper blade for allowing ice cream mixture to leave the inside of the cylinder body. The inlet comprises a lead surface that has a lead angle of at least 3° for pushing the ice cream mixture in the axial direction of the cylinder body.

Using a cylinder body inlet that has an angled lead surface is advantageous in that it assists in continuously pushing the ice cream forward. Obviously, the direction by which the ice cream mixture is pushed is from the ice cream mixture inlet of the housing to the ice cream mixture outlet of the housing. Thus, in addition to agitating and mixing, the dasher also acts a pumping unit for the ice cream mixture. This assists in ensuring that there is a sufficient discharge out from the freezer. In many cases, the angled lead surface also contributes to saving the total amount of energy needed for feeding ice cream mixture through the ice cream freezer.

Other objectives, features, aspects and advantages of the ice cream freezer will appear from the following detailed description as well as from the drawings.

In a second aspect of the invention, above objects are also achieved by an ice cream production system that comprises an ice cream freezer for producing ice cream mass, an ice cream forming apparatus arranged to shape the ice cream mass into individual pieces of ice cream mass, a freezing apparatus arranged to receive the individual pieces of ice cream mass and reduce their temperature, a packaging machine arranged to wrap package material around each individual piece of ice cream mass, where the ice cream freezer is an ice cream freezer according to the first aspect.

In a third aspect of the invention, above objects are also achieved by a method for producing ice cream, the method comprising producing ice cream mass, shaping the ice cream mass into individual pieces of ice cream mass, reducing the temperature of the individual pieces of ice cream mass, wrapping package material around each individual piece of ice cream mass, where the producing of ice cream mass comprises using an ice cream freezer according to the first aspect.

DRAWINGS

Figure 5:
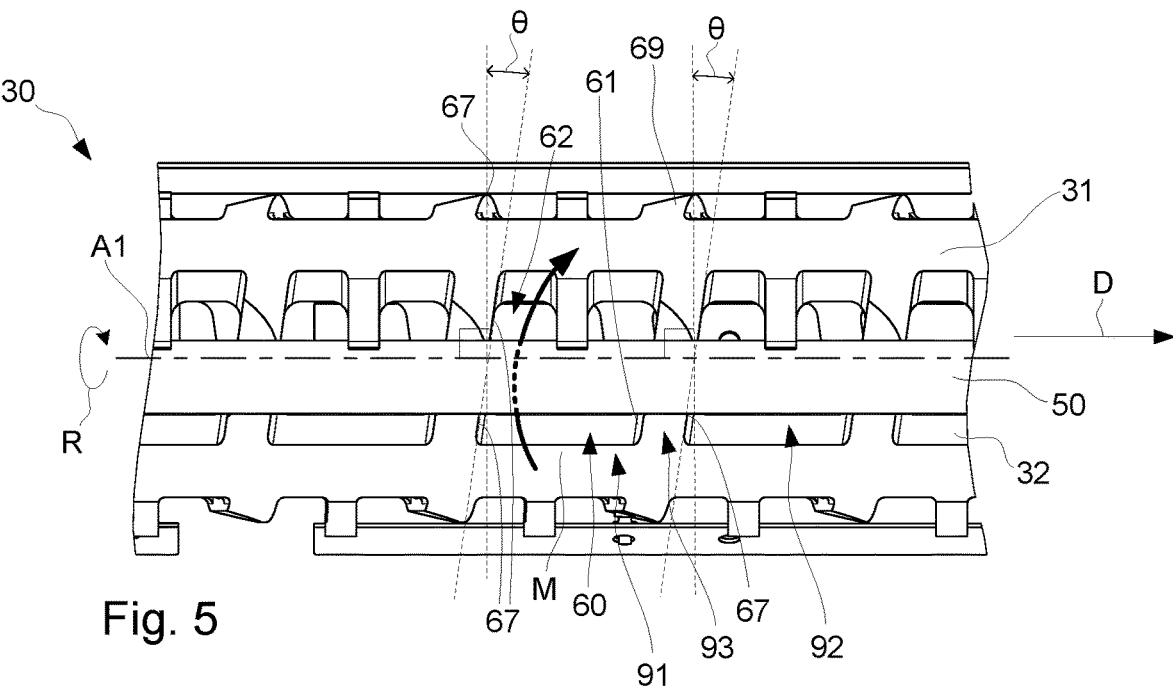
Figure 6:
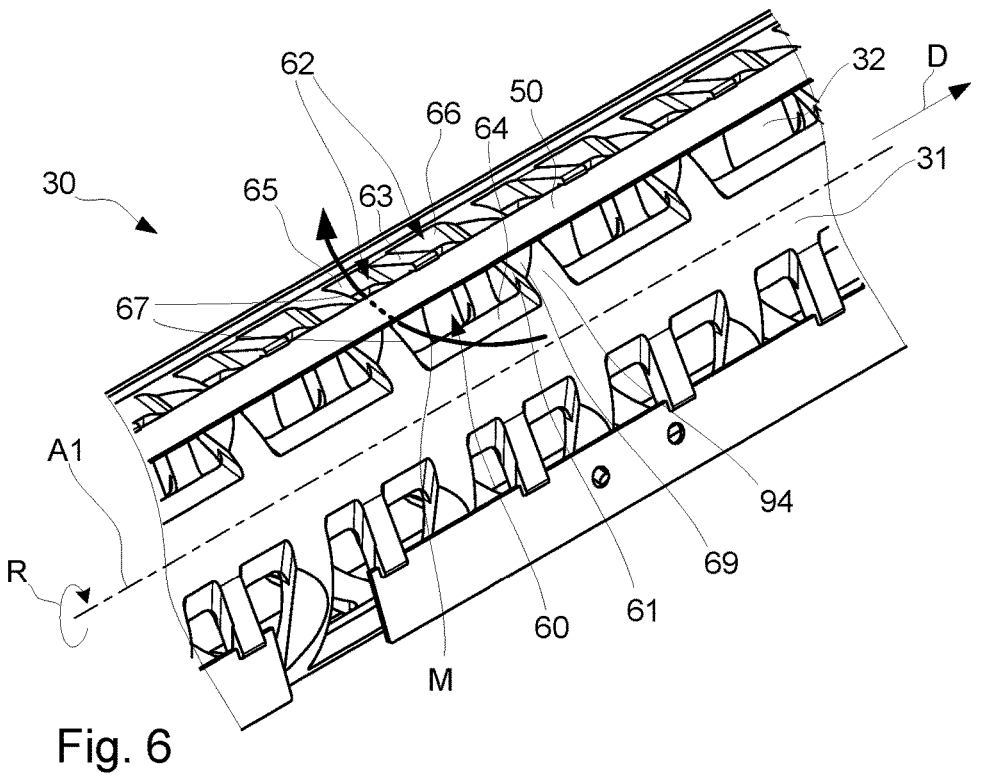
Figure 7:
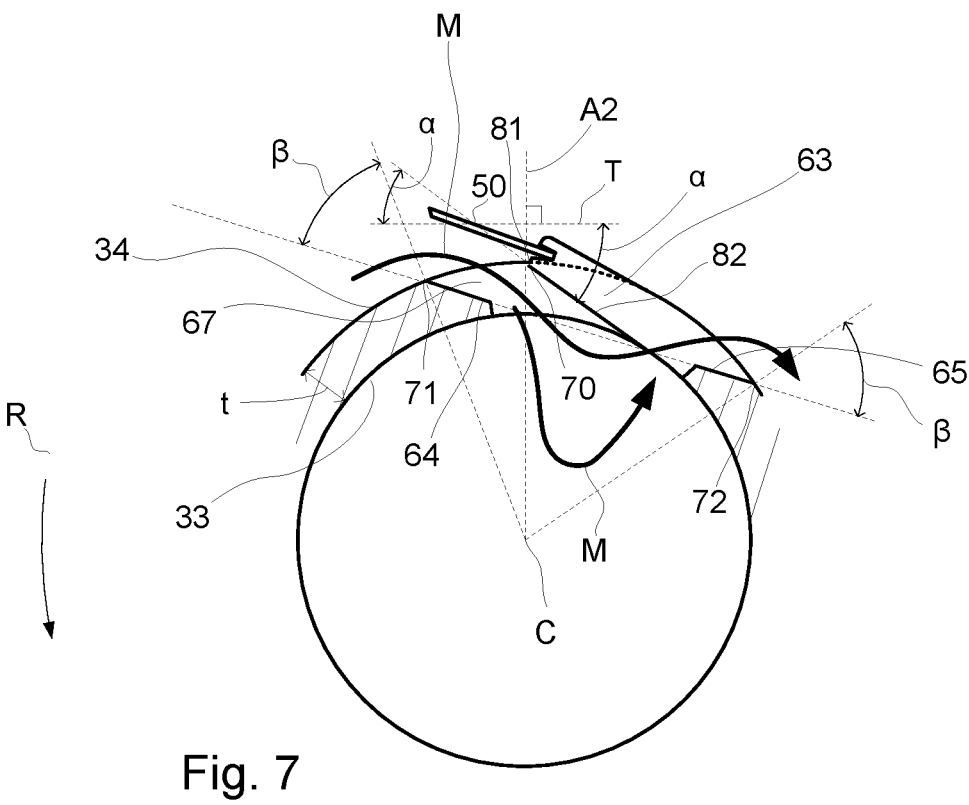
Figure 8:
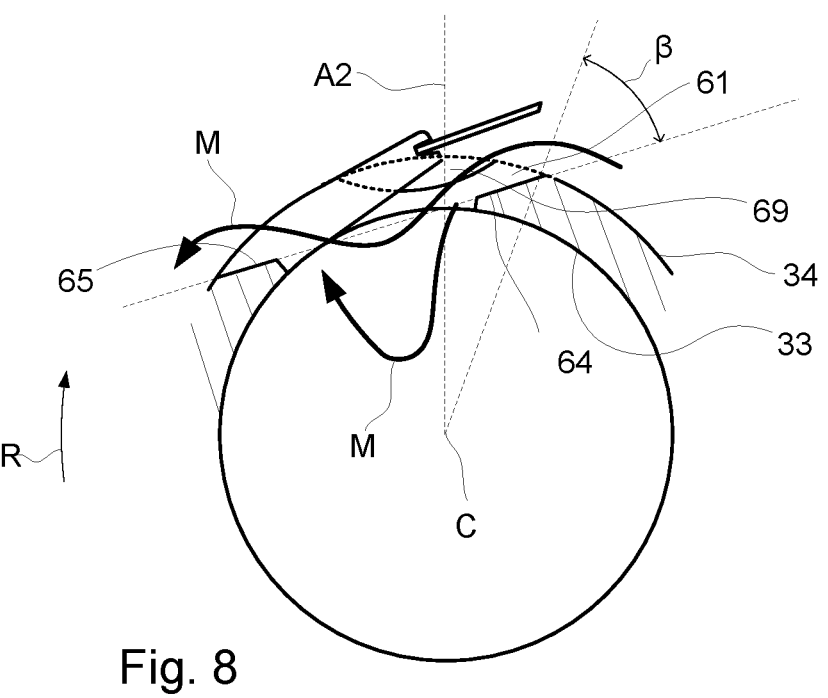
Figures 9, 10, 11:
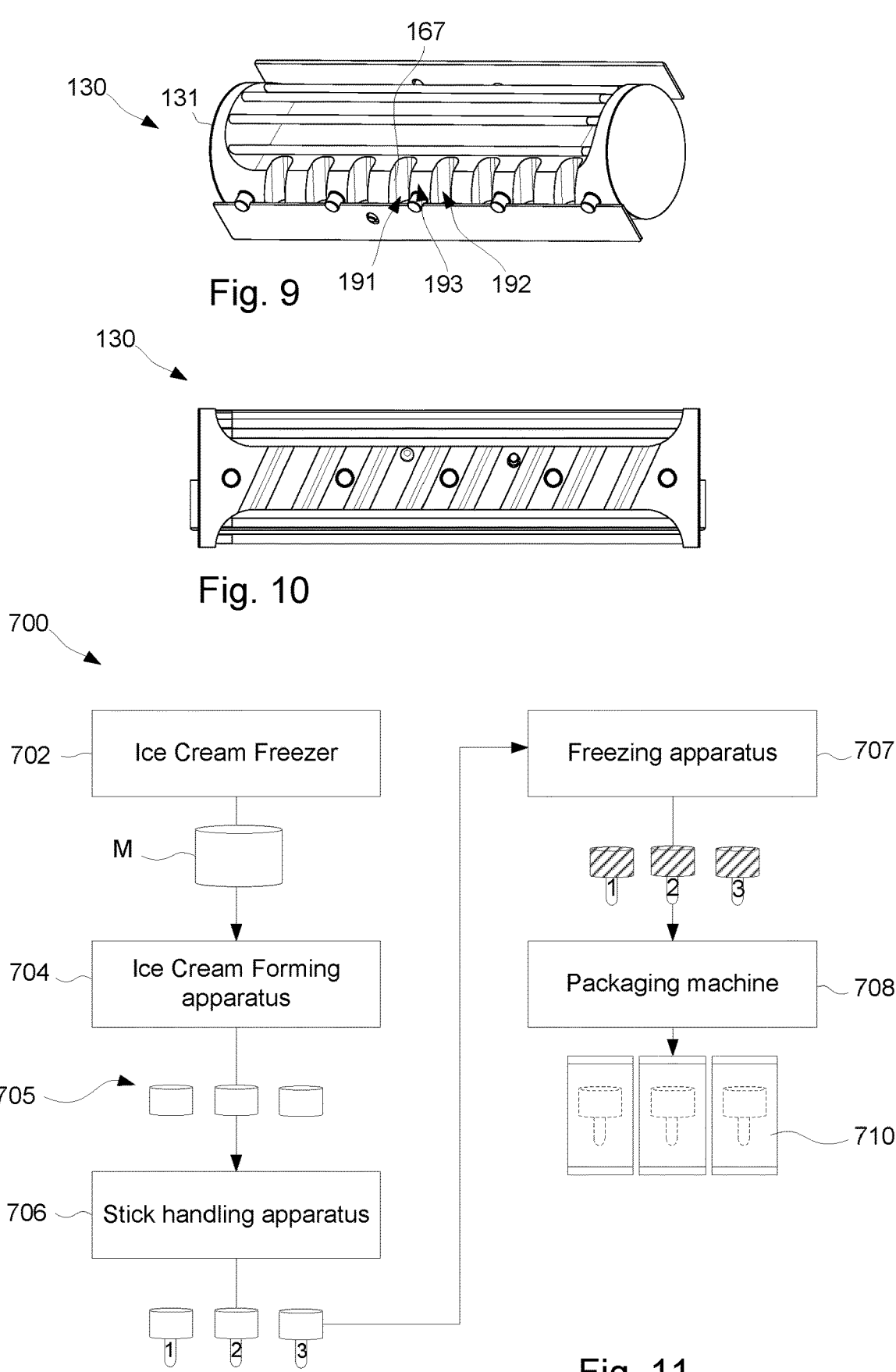
Figure 12:
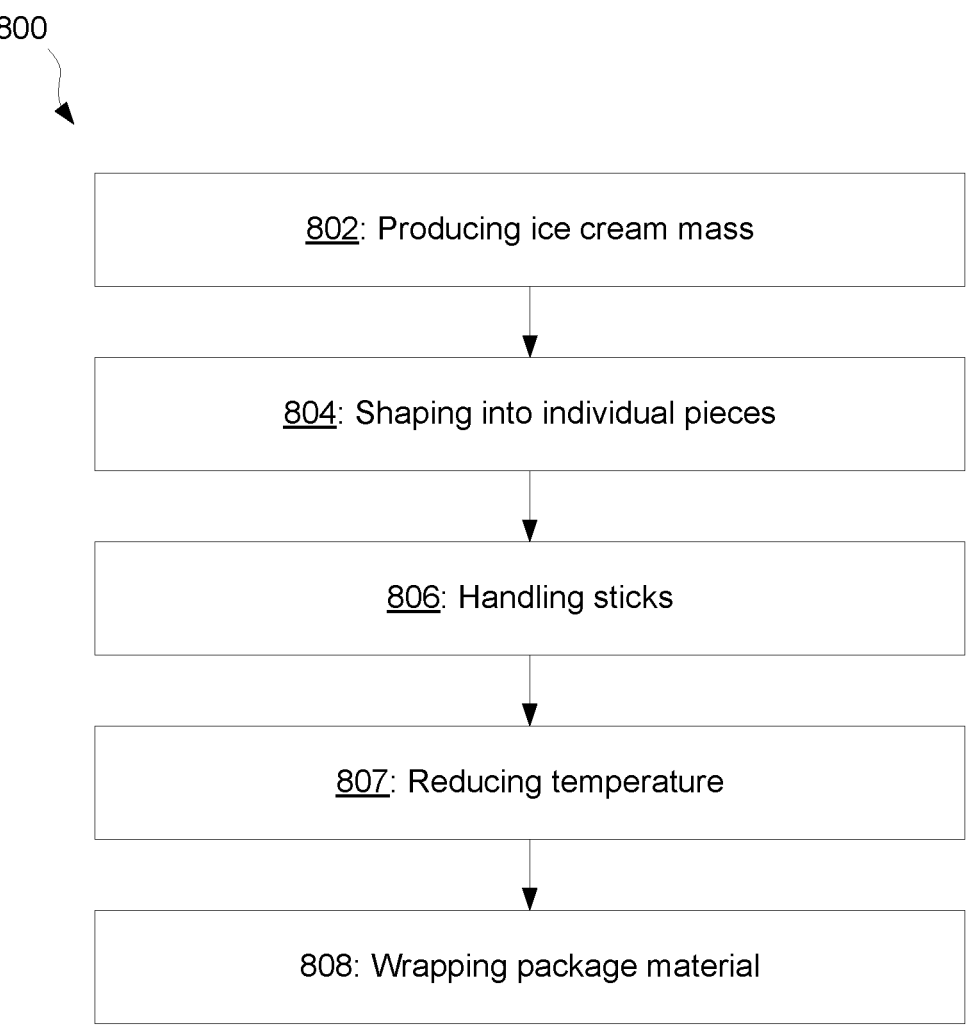

Embodiments of the invention will now be described, by way of example, with reference to the accompanying schematic drawings, where FIG. 1 is a schematic view of an ice cream freezer, FIG. 2 is a perspective view of a dasher for the ice cream freezer shown in FIG. 1, FIG. 3 is a front view of the dasher shown in FIG. 2, FIG. 4 is a side view of the dasher shown in FIG. 2, FIG. 5 is a partial front view of the dasher shown in FIG. 2, FIG. 6 is a partial perspective view of the dasher shown in FIG. 2, FIG. 7 is a schematic, cross-sectional side view of the dasher shown in FIG. 2, FIG. 8 is a schematic, cross-sectional side view of the dasher shown in FIG. 2, corresponding to the view of FIG. 7 but seen from an opposite side, FIG. 9 is a perspective view of another embodiment of a dasher for the ice cream freezer shown in FIG. 1, FIG. 10 is a front view of the dasher shown in FIG. 9, FIG. 11 is a schematic view of an ice cream production system, and FIG. 12 is a flow chart of a method for producing ice cream.

DETAILED DESCRIPTION

With reference to FIG. 1 to 4, an ice cream freezer 1 is illustrated. The ice cream freezer 1 has an elongated housing 2 which has a jacket 3 and a cylindrically shaped interior space 4. A dasher 30 is arranged in the interior space 4 and has a hollow cylinder body 31 that is mounted to rotate in a rotational direction R about a central axis A1 of the cylinder body 31. The cylinder body 31 has a peripheral surface 34 and an interior surface 33, see FIG. 7. The distance between these surfaces 34, 33 defines the thickness t of the hollow cylinder body 31. The thickness may, for example, be 5 mm to 15 mm. The housing 2 has first inlet 11 and a first outlet 12 that are arranged for feeding ice cream mixture M through the interior space 4. The housing 2 has a second inlet 21 and a second outlet 22 that are arranged for feeding a cooling fluid CF, i.e. a refrigerant, through the jacket 3 to thereby cool ice cream mixture M that is fed through the interior space 4. The dasher and all its parts may be made of stainless steel.

A motor (not shown) is connected to an axis 15 of the dasher 30 for rotating the dasher 30. When the dasher is rotated the cylinder body 31 also rotates in the rotational direction R. When this happens ice cream mixture M that is fed through the interior space 4 is agitated and mixed. The cylinder body 31 has a scraper blade 50 that is mounted along the periphery of the cylinder body 31 to enable the blade 50 to scrape off ice cream mixture from the inner wall 5 of the housing 2. The scraper blade 50 is mounted with its tip foremost in the rotational direction R.

With reference to FIGS. 5 and 6, the cylinder body 31 has an inlet 60 that is, as seen in the rotational direction R, located before the scraper blade 50. This allows ice cream mixture M to be pushed into an inside 32 of the hollow cylinder body 31 when it is rotated. The cylinder body 31 has an outlet 62 that is, as seen in the rotational direction R, located after the scraper blade 50. This provides for letting out ice cream mixture M from the inside 32 of the cylinder body 31 when it is rotated. In this way ice cream mixture M may be continuously fed into and out from the inside 32 of the cylinder body 31.

The inlet 60 has a lead surface 67 that has a lead angle θ of at least 3°. The lead surface 67 pushes the ice cream mixture M in the axial direction D of the cylinder body 31. This effectively pushes the ice cream mixture M in the direction from the first inlet 11 to the first outlet 12, which are arranged for feeding ice cream mixture M through the interior space 4 of the housing 2.

The lead angle θ may be at least 5°, at least 8°, at least 15° or even at least 30°. When the lead angle θ is at least 3°, 5°, 8°, or 15°, then the lead angle θ may be less than 25°, i.e. have an upper limit of 25°. The lead angle θ references a line perpendicular to the axis A1 of the cylinder body 31, and is the complement to the helix angle which references the axis A1 of the cylinder body 31. The lead surface 67 may be slightly concave or may be slightly convex, in which case the lead angle θ is calculated as the mean lead angle for the curvature forming the lead surface 67. The inlet 60 may have a surface 61 that is opposite the lead surface 67 and inclined by an angle that is same as the lead angle θ of the lead surface 67.

The inlet 60 and the outlet 62 may form a hole 91 in the cylinder body 31, and the scraper blade 50 may be arranged above the hole 91 to separate the hole 91 into the inlet 60 and outlet 62. This is advantageous form a manufacturing perspective, allowing both the inlet 60 and outlet 62 to be created in one operation, having the scraper blade 50 separating the inlet 60 from the outlet 62. The hole 91 is also advantageous in that ice cream mixture more easily flows in to and out from the inside 32 of the cylinder body 31 via the inlet 60 and outlet 62.

The lead surface 67 may extend from the inlet 60 to the outlet 62. This is advantageous in that the outlet 62 then also comprises the lead surface 67, further enhancing the pumping effect of the dasher 30. The outlet 62 may also have a surface that is opposite the lead surface 67 and inclined by an angle that is same as the lead angle θ of the lead surface 67.

With further reference to FIGS. 7 and 8, the inlet 60 may comprise an inlet surface 64 that is top chamfered or top beveled by an angle β of at least 10°. In the illustrated example the inlet surface 64 is chamfered. The angle β of the chamfer (inlet chamfer) 64 is measured relative the radial direction of the cylinder body 31 at the location 71 where the chamfer 64 starts on the peripheral surface 34 of the cylinder body 31, as indicated in FIG. 7. The chamfer 64 extends inwards in a direction towards the interior surface 33 of the hollow cylinder body 31. The chamfer 64 may have an angle β of at least 20°, at least 40°, or at least 60°.

The inlet surface 64 may be top chamfered over at least 30% of the thickness t of the cylinder body 31. The inlet surface 64 may be top chamfered over at least 30%, least 40%, least 50%, least 60% or least 80% of the thickness t of the cylinder body 31. It may even be top chamfered over 100% of the thickness t of the cylinder body 31, in which case it is beveled.

Having a chamfered inlet surface 64 is advantageous in that ice cream mass is more easily pushed to the inside 32 of the cylinder body 31, requiring less energy to rotate the dasher 30. Additionally, the mixing efficiency of the dasher 30 is increased.

The outlet 62 of the cylinder body 31 may comprise an outlet surface 65 that is top chamfered or top beveled by an angle β of at least 10°. In the illustrated example the outlet surface 65 is chamfered. The angle β of the outlet chamfer 65 is measured relative the radial direction of the cylinder body 31 at the location 72 where the outlet chamfer 65 starts on the peripheral surface 34 of the cylinder body 31, as indicated in FIG. 7. The outlet chamfer 65 extends inwards in a direction towards the interior surface 33 of the hollow cylinder body 31. The outlet chamfer 65 may have an angle β of at least 20°, at least 40°, or at least 60°.

The outlet surface 65 may be top chamfered over at least 30% of the thickness t of the cylinder body 31. The outlet surface 65 may be top chamfered over at least 30%, least 40%, least 50%, least 60% or least 80% of the thickness t of the cylinder body 31. It may even be top chamfered over 100% of the thickness t of the cylinder body 31, in which case it is beveled.

Having a chamfered outlet surface 65 is advantageous in that ice cream mass more easily flows out from the inside 32 of the cylinder body 31, requiring less energy to rotate the dasher 30. Additionally, the mixing efficiency of the dasher 30 is increased.

The inlet chamfer 64 and the outlet chamfer 65 may be chamfered or beveled by the same chamfer or bevel angle. This is advantageous from a manufacturing perspective and also improves the flow of ice cream mixture into and out from the cylinder body 31.

The cylinder body 31 may have a protrusion 63 that extends over the outlet 62. As can be seen in FIG. 7, the scraper blade 50 may be attached to an end section 81 of the protrusion 63. The scraper blades attachment point is then located above the hole 91. The protrusion 63 may extend from the outlet surface 65 and separate the outlet 62 into two outlet surface sections 65, 66.

The protrusion 63 may comprise an inner surface 82 that is directed towards a center C of the cylinder body 31. This inner surface 82 may inclined by an angle α of at least 10° relative a tangential direction T of the cylinder body 31. The tangential direction T is defined by the point 70 on the cylinder body 31 that is radially aligned with the end section 81 of the protrusion 63, as shown in FIG. 7 along axis A2.

Turning back to FIG. 5, the hole 91 may be one of a sequence of similar holes 91, 92 that are arranged in the cylinder body 31. The holes 91, 92 extend in the axial direction D of the cylinder body 31 and are separated by ribs 93. The scraper blade 50 extends over the ribs 93. As is best seen in FIG. 6, the ribs 93 have a respective outer surface 94 that is chamfered or beveled by at least 3 mm in the axial direction D of the cylinder body 31, forming a chamfer 69 in the rib 93. The chamfer 69 in the rib 93 is located where the scraper blade 50 extends over the rib 93. The chamfer 69 may extend over at least 75% of the width of the rib 93, or may even extend over the entire width of the rib 93. The width of the rib 93 extends in the axial direction D of the cylinder body 31. The width of the rib may, for example, be 10 mm to 20 mm. The chamfer 69 in the rib 93 provides for easier cleaning as well as for improved flow of ice cream mixture M, in particular out from the outlet 62.

One or more of the ribs 91 may comprise the lead surface 67 of an inlet 60 of the cylinder body 31. Then the outer surfaces 94 of the ribs 91 are preferably chamfered or beveled on the side 61 of the respective rib 91 that that is opposite the lead surface 67 that is comprised in the rib 91.

In addition to the ribs 93 described herein, the cylinder body 31 may include ribs that have other forms and shapes. The same applies for holes 91, 92 that are formed by inlets 60 and outlets 62 of the cylinder body 31, i.e. the cylinder body 31 may include other shapes and types of inlets and outlets. Another example of a dasher 130 is shown in FIGS. 9 and 10. For this dasher 130 the cylinder body 131 has different shapes of the holes 191, 192 and the ribs 193, where an angled lead surface 167 assists in pushing the ice cream mixture in the axial direction.

With reference to FIG. 11 an ice cream production system 700 is illustrated. In brief, by using cream, sugar and other ingredients, ice cream mass M can be produced by using an ice cream freezer 702. The ice cream freezer 702 is advantageously an ice cream freezer 1 as described above. The ice cream mass M may thereafter be formed in an ice cream forming apparatus 704 into individual pieces 705 of ice cream mass. This may be made in different ways, e.g. by using extrusion or moulding. A stick handling apparatus 706, which is optional, may place ice cream sticks in the individual pieces 705 of ice cream mass.

After being provided with sticks, the individual pieces 705 may be placed in a freezing apparatus 707, e.g. a freezing tunnel. Lastly, in a packaging machine 708, the individual pieces 705 can be wrapped in package material 710 such that ice cream products ready to be shipped are formed. The ice cream forming apparatus 704, the stick handling apparatus 706, the freezing apparatus 707 and the packaging machine 708 are typically commercially available apparatuses suitable for ice cream production.

With reference to FIG. 12 a method 800 for producing ice cream is illustrated. The method 800 comprises producing 802 ice cream mass, shaping 804 the ice cream mass M into individual pieces of ice cream mass, reducing 807 the temperature of the individual pieces of ice cream mass and wrapping 808 package material 710 around each individual piece of ice cream mass 705. The producing 802 of ice cream mass 304 comprises using an ice cream freezer 1 as described above. Optionally, ice cream sticks are handled 806 by inserting the sticks into the individual pieces of ice cream mass.

From the description above follows that, although various embodiments of the invention have been described and shown, the invention is not restricted thereto, but may also be embodied in other ways within the scope of the subject-matter defined in the following claims.

The invention claimed is:

1. An ice cream freezer comprising
   an elongated housing having a jacket and an interior space, and
   a dasher comprising a hollow cylinder body arranged in the interior space for rotating in a rotational direction about a central axis of the cylinder body to agitate and mix ice cream mixture that is fed through the interior space, the cylinder body comprising
   a scraper blade arranged along the periphery of the cylinder body,
   an inlet that is, as seen in the rotational direction, located before the scraper blade for allowing ice cream mixture to enter an inside of the cylinder body, and an outlet that is, as seen in the rotational direction, located after the scraper blade for allowing ice cream mixture to leave the inside of the cylinder body, wherein the inlet comprises a lead surface that has a lead angle of at least 3° for pushing the ice cream mixture in the axial direction of the cylinder body.

2. The ice cream freezer according to claim 1, wherein the inlet and the outlet form a hole in the cylinder body, the scraper blade being arranged above the hole to separate the hole into the inlet and outlet.

3. The ice cream freezer according to claim 1, wherein the lead surface extends from the inlet to the outlet, such that the outlet also comprises the lead surface.

4. The ice cream freezer according to claim 1, wherein the inlet comprises an inlet surface that is top chamfered or top beveled by an angle of at least 10°.

5. The ice cream freezer according to claim 4, wherein the inlet surface is top chamfered over at least 30% of a thickness of the cylinder body.

6. The ice cream freezer according to claim 1, wherein the outlet comprises an outlet surface that is top chamfered or top beveled by an angle of at least 10°.

7. The ice cream freezer according to claim 6, wherein the outlet surface is top chamfered over at least 30% of a thickness of the cylinder body.

8. The ice cream freezer according to claim 1, wherein the cylinder body comprises a protrusion that extends over the outlet, and the scraper blade is attached to an end section of the protrusion.

9. The ice cream freezer according to claim 6, wherein a protrusion extends from the outlet surface and separates the outlet into two outlet sections.

10. The ice cream freezer according to claim 8, wherein the protrusion comprises an inner surface that is directed towards a center of the cylinder body, said inner surface being inclined by an angle of at least 10° relative a tangential direction of the cylinder body, said tangential direction being defined by a point on the cylinder body that is radially aligned with the end section of the protrusion.

11. The ice cream freezer according to claim 1, wherein the inlet comprises a surface that is opposite the lead surface and inclined by an angle that is same as the lead angle of the lead surface.

12. The ice cream freezer according to claim 2, wherein the hole is one of a sequence of similar holes arranged in the cylinder body, said holes extending in the axial direction of the cylinder body and being separated by ribs over which the scraper blade extends, the ribs comprising an outer surface that is chamfered or beveled by at least 3 mm in the axial direction of the cylinder body at a location where the scraper blade extends over the ribs.

13. The ice cream freezer according to claim 12, wherein each rib comprises the lead surface of an inlet of the cylinder body, the outer surface of each rib being chamfered or beveled on a side of each rib that that is opposite the lead surface comprised in each rib.

14. An ice cream production system comprising
an ice cream freezer for producing ice cream mass,
an ice cream forming apparatus arranged to shape the ice cream mass into individual pieces of ice cream mass,
a freezing apparatus arranged to receive the individual pieces of ice cream mass and reduce their temperature,
a packaging machine arranged to wrap package material around individual pieces of ice cream mass, wherein
the ice cream freezer is an ice cream freezer according to claim 1.

15. A method for producing ice cream, comprising
producing ice cream mass,
shaping the ice cream mass into individual pieces of ice cream mass,
reducing the temperature of the individual pieces of ice cream mass,
wrapping package material around individual pieces of ice cream mass, wherein
the producing of ice cream mass comprises using an ice cream freezer according to claim 1.

* * * * *